No. 660,538. Patented Oct. 23, 1900.
C. C. BROWN.
CHEESE CABINET.
(Application filed Feb. 15, 1900.)

(No Model.)

Witnesses

Inventor
Charles Calvin Brown,
By
W. J. Duvall
Atty.

THE NORRIS PETERS CO., PHOTO-LITHO., WASHINGTON, D. C.

UNITED STATES PATENT OFFICE.

CHARLES CALVIN BROWN, OF LEWISBURG, PENNSYLVANIA, ASSIGNOR, BY DIRECT AND MESNE ASSIGNMENTS, OF TWO-THIRDS TO W. F. HOFFA AND S. H. HIMMELREICH, OF SAME PLACE.

CHEESE-CABINET.

SPECIFICATION forming part of Letters Patent No. 660,538, dated October 23, 1900.

Application filed February 15, 1900. Serial No. 5,363. (No model.)

*To all whom it may concern:*

Be it known that I, CHARLES CALVIN BROWN, a citizen of the United States, residing at Lewisburg, in the county of Union and State of Pennsylvania, have invented certain new and useful Improvements in Cheese-Cabinets; and I do hereby declare the following to be a full, clear, and exact description of the invention, such as will enable others skilled in the art to which it appertains to make and use the same.

This invention relates to improvements in cabinets for cheeses.

The objects of the invention are to produce a cheap, simple, and convenient as well as ornamental cabinet either for domestic use or for use in retail stores for containing cheeses and preserving the same against the deleterious action of the atmosphere and the encroachment of vermin, the said cabinet being so constructed as when opened to automatically present the cheese contained therein for convenient cutting, and therefore without the cabinet, and, furthermore, to automatically upon a closing of the cabinet reinsert the cheese within the same.

A further object of the invention is to provide for a ready disengagement and removal of the several parts one from the other to permit of a thorough cleansing of the cabinet.

Figure 1:
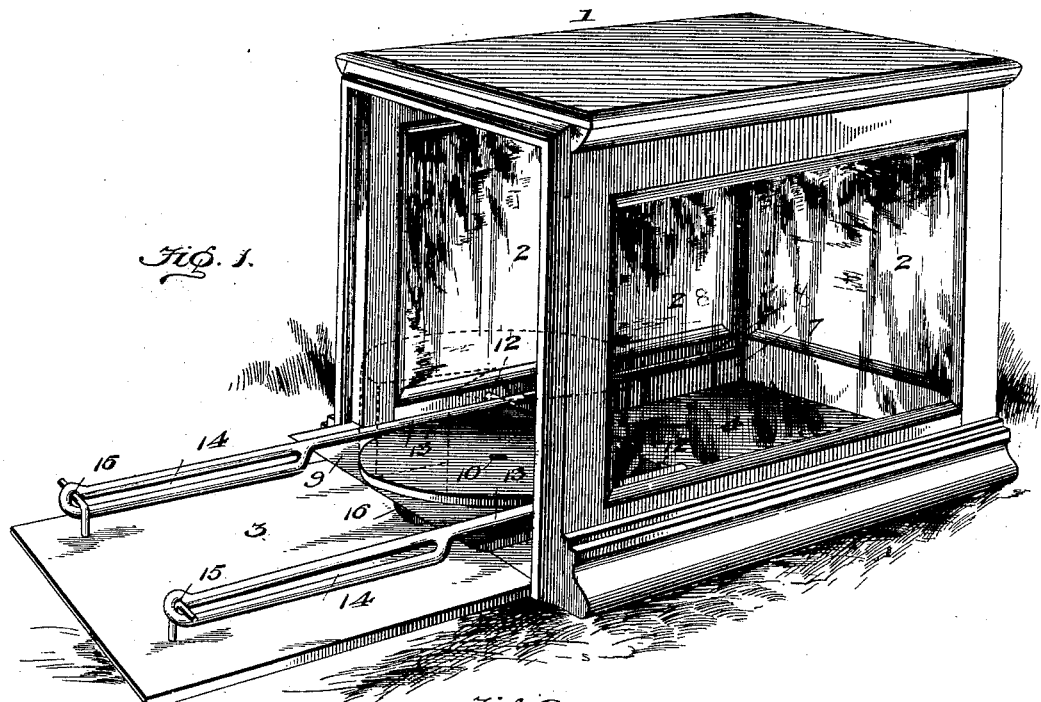
Figure 2:
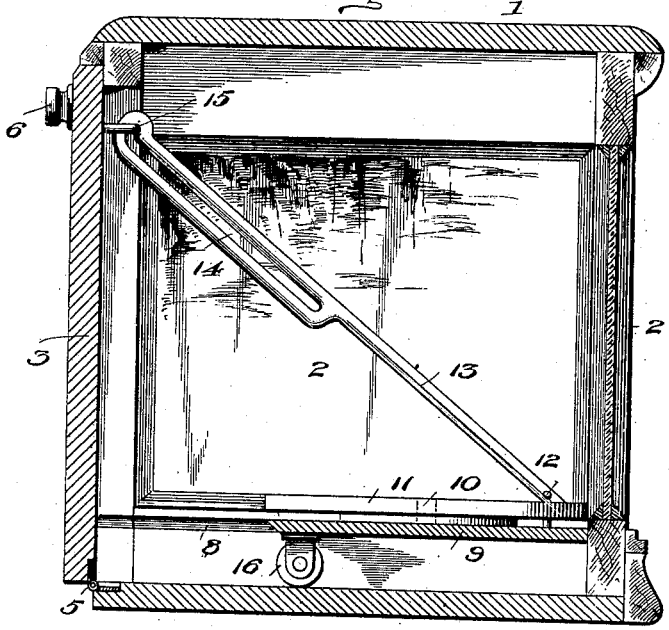

Referring to the drawings, Figure 1 is a perspective view of a cheese-cabinet constructed in accordance with the invention, the same being shown as open, the cheese being indicated in dotted lines. Fig. 2 is a vertical transverse sectional view of the same, the cheese being removed and the cabinet closed.

Like numerals of reference indicate like parts in both figures of the drawings.

1 designates an ordinary cabinet, the same being in this instance rectangular, but which may be of any desired shape and design. Three of the sides of said cabinet may be provided with light-panels 2, formed of glass, and the fourth side is closed by a door 3, which is hinged at its lower edge to the base or bottom 4, whereby it is adapted to open downwardly, the said door moving or swinging on the hinges 5. The door may be provided at its upper end with any shape or design of handle 6, and it may be either solid, and therefore opaque, or, like the remaining walls, it may be of glass.

The opposite lower stiles 7 of the two side walls of the cabinet are provided with parallel grooves 8, and mounted for movement in said grooves is a shelf 9, the same being capable of withdrawal from the grooves, as hereinafter explained. Supported centrally upon the shelf 9, upon an axis or supporting-post 10, is a rotatable circular platform 11, upon which may be supported a cheese or a fraction thereof, the platform being capable of being revolved or rotated, so as to present any portion of the cheese to the rear or open side of the cabinet. Inverted-L-shaped hooks 12 are located at and rise from points near the opposite outer corners of the shelf and extend inwardly in a horizontal manner from the upper corners of the swinging door. The hooks of the door have their upper bent extremities outwardly and oppositely disposed to those of the shelf, which latter are inwardly disposed, as shown.

13 designates a pair of rigid connecting-rods, the lower ends of which are perforated and preferably pivotally and removably connected with the L-shaped hooks of the shelf and the upper ends of which rods may be likewise connected to the L-shaped hooks of the door, but are preferably provided with elongated slots 14, provided at their outer ends in their upper sides with notches 15, which are normally in engagement with the said hooks. The under side of the shelf may have applied thereto an ordinary caster or roller 16, which contacts with the bottom of the cabinet and which also is designed to ride over the door when the latter is in its lowered position and the shelf withdrawn from out the cabinet.

The cheese, as indicated by dotted lines in Fig. 1, rests upon the revolving platform, which latter may be moved to any point to permit of access being had to any portion of the cheese. By lowering the door through the medium of the handle it will be apparent that the connecting-rods will serve to draw the shelf and platform containing the cheese from out the cabinet, and by closing the door the shelf and platform will be moved inward within the cabinet, and therefore the cheese protected, as heretofore explained. If it be desired at any time to clean the cabinet, it will be obvious that the connecting-rods may be readily disengaged from the front hooks or those of the door and the shelf removed; whereby access to the shelf and platform and the interior of the cabinet may be readily had. While the shelf simply by lowering the door emerges ordinarily sufficiently far to give access to the cheese, yet in many instances, owing to surrounding obstructions or the position of the cabinet, it is desirable that the shelf and its platform be still farther withdrawn from the cabinet. It is for this reason and to accomplish this purpose that the upper ends of the connecting-rods are preferably slotted, for, as will be obvious, in order to effect a further withdrawal the outer ends of the connecting-rods are simply raised, so as to disengage their notches with the inverted-L-shaped hooks, whereupon the shelf may be slid farther out, the caster serving to support the front end of the shelf when the latter is in this position.

From the foregoing description, in connection with the accompanying drawings, it will be observed that the device described preserves the cheese therein contained against the deleterious or drawing action of the atmosphere, as well as from vermin, and that by the raising or lowering of the door the same is automatically inserted or withdrawn from the cabinet without further effort upon the part of the user, an operation easy to follow and not readily omitted.

Having described my invention, what I claim is—

1. The combination with a cabinet having opposite ways and at one side a downwardly-opening door hinged to the bottom of the cabinet and adapted to lower into the same plane as and form a continuation of the bottom thereof; of connecting rods loosely connected to the door near its upper free end; and a shelf mounted in the ways and loosely connected at its inner end to the free ends of said rods.

2. The combination with a cabinet having opposite ways in its side walls and a door hinged, at its lower edge, to the bottom of the cabinet; of a shelf mounted in the ways; hooks on the shelf and near the free edge of the door; and connecting-rods between the hooks, the outer ends of the connecting-rods being provided with slots, the upper sides of which are formed with notches located near the outer ends of the slots and adapted to normally engage the hooks of the door.

3. The combination with the cabinet having opposite ways and a downwardly-opening door hinged to and in the same plane with the bottom of the cabinet; of a sliding shelf carried by the ways, a caster on the under side of the shelf adapted to move over the bottom and the door, hooks projecting from the shelf and the door; and slotted connecting-rods provided with notches near their free ends, and loosely connected to the hooks of the shelf and door.

In testimony whereof I affix my signature in the presence of two witnesses.

CHARLES CALVIN BROWN.

Witnesses:
O. W. BROWN,
H. N. PARTH.